US007823766B1

(12) United States Patent
Dittmer

(10) Patent No.: US 7,823,766 B1
(45) Date of Patent: Nov. 2, 2010

(54) FINANCIAL TRANSACTION SYSTEM

(75) Inventor: Charles H. Dittmer, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1431 days.

(21) Appl. No.: 11/239,923

(22) Filed: Sep. 30, 2005

(51) Int. Cl.
*G06F 17/00* (2006.01)
(52) U.S. Cl. .................................................. 235/375
(58) Field of Classification Search ............... 235/375, 235/380, 382
See application file for complete search history.

(56) References Cited

U.S. PATENT DOCUMENTS

| 7,478,065 B1 * | 1/2009 | Ritter et al. ............... 705/39 |
| 7,494,067 B1 * | 2/2009 | Zhu ............................ 235/492 |
| 2001/0023180 A1 | 9/2001 | Sauer |
| 2003/0174049 A1 | 9/2003 | Beigel et al. |
| 2007/0194113 A1 * | 8/2007 | Esplin et al. ................ 235/383 |

FOREIGN PATENT DOCUMENTS

WO   WO 02/063526 A1   8/2002

\* cited by examiner

*Primary Examiner*—Jamara A Franklin

(57) ABSTRACT

A system and method for conducting a financial transaction is disclosed. The system includes a first memory location embedded in a personal portable device. The first memory location stores a plurality of personal financial data files associated with a user. The system also includes a second memory location to store biometric information and a first input interface to receive authentication information after initiation of a purchase transaction session. The system also includes a security module including an input coupled to the first interface to authenticate the authentication information based on the biometric information and an output interface comprising an input coupled to the first memory location and an output to provide personal financial data file information to a host device.

16 Claims, 3 Drawing Sheets

FINANCIAL TRANSACTION SYSTEM

FIELD OF THE DISCLOSURE

The present disclosure relates generally to financial transactions and more particularly to use of portable systems for financial transactions.

BACKGROUND

Consumer financial transactions, including purchase transactions, often require the exchange of financial account information, such as credit card information. The seller of a product or service may require a purchaser to provide account numbers, personal authentication information, or other information in order to provide payment for the product or service. Even when not required by a seller, paying for the product or service in this way may be more convenient for the purchaser than other payment methods, such as cash payment. However, there are security risks for both the purchaser and the seller associated with using personal account information to conduct a financial transaction. In addition, particular sellers may only allow payment through particular kinds of financial accounts, requiring a purchaser to be in possession of a wide variety of financial account information.

Therefore, a method and system for conducting financial transactions that can provide security and convenience is needed.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

A system and method for conducting a financial transaction is disclosed. One embodiment of the system includes a first memory location embedded in a personal portable device. The first memory location stores a plurality of personal financial data files associated with a user. The system also includes a second memory location to store biometric information of a user of the personal portable device and a first input interface to receive authentication information after, initiation of a purchase transaction session. The system also includes a security module including an input coupled to the first interface to authenticate the authentication information based on the biometric information and an output interface comprising an input coupled to the first memory location and an output to provide personal financial data file information to a host device.

One embodiment of the method includes initiating at a host a purchase transaction session with a personal portable device, transmitting biometric information from the host to the personal portable device, wherein the biometric information is associated with a first person and receiving information identifying a plurality of available data files associated with the first person from the personal portable device after transmitting the biometric information. In a particular embodiment, the available data files are associated with a corresponding financial account of the first person and each available data file includes one or more account records. The method also includes requesting one or more account records associated with a first data file of the plurality of available data files from the portable device and receiving the one or more account records.

Figure 1:
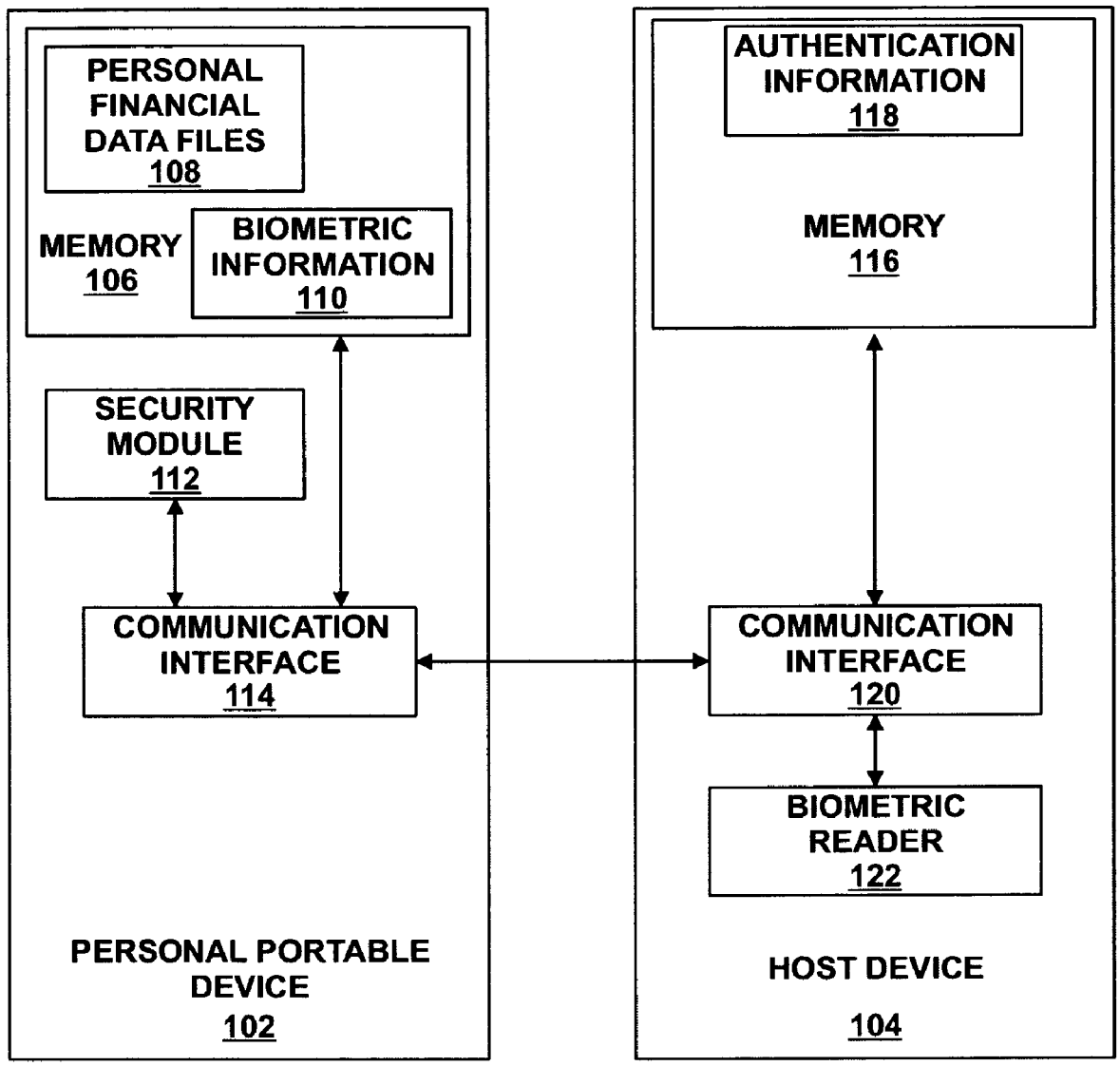
FIG. 1 is a block diagram of a particular embodiment of a system for conducting a financial transaction.

Referring to FIG. 1, a system for conducting a financial transaction is illustrated. The system includes a personal portable device 102, and a host device 104. The host device 104 communicates with the personal portable device 102 via an interface. In a particular embodiment, the interface is a wireless interface. In another particular embodiment, the interface is a physical connector.

The personal portable device 102 includes a memory 106, a security module 112, and a communication interface 114. The memory 106 is coupled to the communication interface 114. The communication interface 114 is coupled to the security module 112. The memory 106 stores personal financial data files 108 and biometric information 110.

The personal portable device 102 may be a security card, a keychain device, or other appropriate device. A personal portable device, such as the personal portable device 102 is a device that is of sufficiently small size to allow a user to conveniently carry the device on his person.

The host device 104 includes a memory 116, a communication interface 120, and a biometric reader 122. The memory 116 stores authentication information 118. The host device 104 may be a host computer, a cash register, or other appropriate form factor. The host device 104 may be located to conveniently conduct financial transactions, such as in retail establishments, such as a department store, convenience store, restaurant, and the like. In one embodiment, the host device 104 is associated with a check-out location of an establishment. In another embodiment host device 104 is associated with a service provided by the establishment, such as an automated transaction machine (ATM).

During operation, the personal portable device 102 may interface with the host device 104 to conduct a financial transaction. To conduct a transaction, the personal portable device 102 and the host device 104 communicate via the communication interface 114. The host device 104 may receive and transmit communications to the personal portable device 102 via the communication interface 120. In a particular embodiment, the communication interface 114 and the communication interface 120 may receive and transmit information over a physical connection, as opposed to a wireless connection. For example, the personal portable device 102 may be the size and dimensions of a credit card, and may be inserted into a card slot in the host device 104, resulting in the communication interface 120 being in communication with the communication interface 114. In an alternative embodiment, the communication interface 120 and the communication interface 114 may communicate wirelessly. In a particular embodiment, the host device 104 may detect a wireless protocol supported by the personal portable device 102. For example, the host device 104 may send a query recognizable by the personal portable device 102, and in response receive information from the device related to the wireless protocols supported by the device.

The host device 104 includes a biometric reader 122. The biometric reader 122 may be used to obtain biometric information from a customer or other initiator of a financial transaction. The biometric reader may include a fingerprint reader, retinal scanner or other biometric device.

The biometric information may be used to provide security and authentication information for the financial transaction. In particular, the biometric reader 122 may provide the biometric information to the personal portable device via the communication interface 120. The security module 112 of the personal portable device 102 may then compare the biometric information received from the host device 104 to the biometric information 110 stored in the memory 106. If the biometric information received from the host device 104 does not match the biometric information 110 stored in the memory 106, the security module 112 may transmit a message to the host device 104 indicating a breach of security, and the host device 104 may take appropriate action. The security module 112 may take further security measures in response to biometric information received from the host device 104 not matching the biometric of the personal portable device 102, such as erasing the personal financial data files 108 or disabling the personal portable device 102. Other security measures are possible. For example the, security module 112 may instruct the host device 104 to provide a notification or report to a security clearinghouse, a credit card company or bank, or other entity. The host may also be instructed to provide the biometric information received at the biometric reader 122 to a law enforcement agency or other appropriate entity.

If there is a match in the biometric information, the personal portable device 102 may provide the personal financial data files 108 to the host device 104. The host device 104 may use the authentication information 118 to authenticate the personal financial data files 108. The authentication information 118 may include password information, personal identification number (PIN) information, or other authentication information. The authentication information 118 may be obtained from a purchaser after a financial transaction has been initiated, from a central database of authentication information (such a database that stores credit card numbers and associated user information), or from another appropriate source. The authentication information may be protected. For example, the authentication information may be encrypted using a personal or private key or password.

After the personal financial data files 108 have been authenticated, the information associated with the files may be used to complete a financial transaction. For example, if the personal financial data files 108 include credit card information, a charge may be assessed against the associated credit card account. After the financial transaction has been completed, the host device 104 may send a signal or other indication to the personal portable device 102 indicating completion of the transaction. The host device 104 may send further information, such as information to enable the personal portable device 104 to update account records stored at the device.

The personal financial data files 108 may include a plurality of data files. Each data file may contain information associated with personal financial records. A personal financial record includes specific information associated with a particular financial account. For example, a personal financial record may include a credit card number and expiration date associated with a particular credit card account. The personal financial record may also include information such as an account holder name, a credit limit, authentication information, and the like. The personal financial data files 108 may store multiple personal financial records in each data file, or may store a single record in each file. In addition, the personal financial data files 108 may be configured in a variety of ways. For example, the personal financial data files 108 may include a data file that stores all of the credit card numbers associated with the user of the personal portable device 102, and may include expiration information for each credit card in a separate file. Other configurations are possible.

Figure 2:
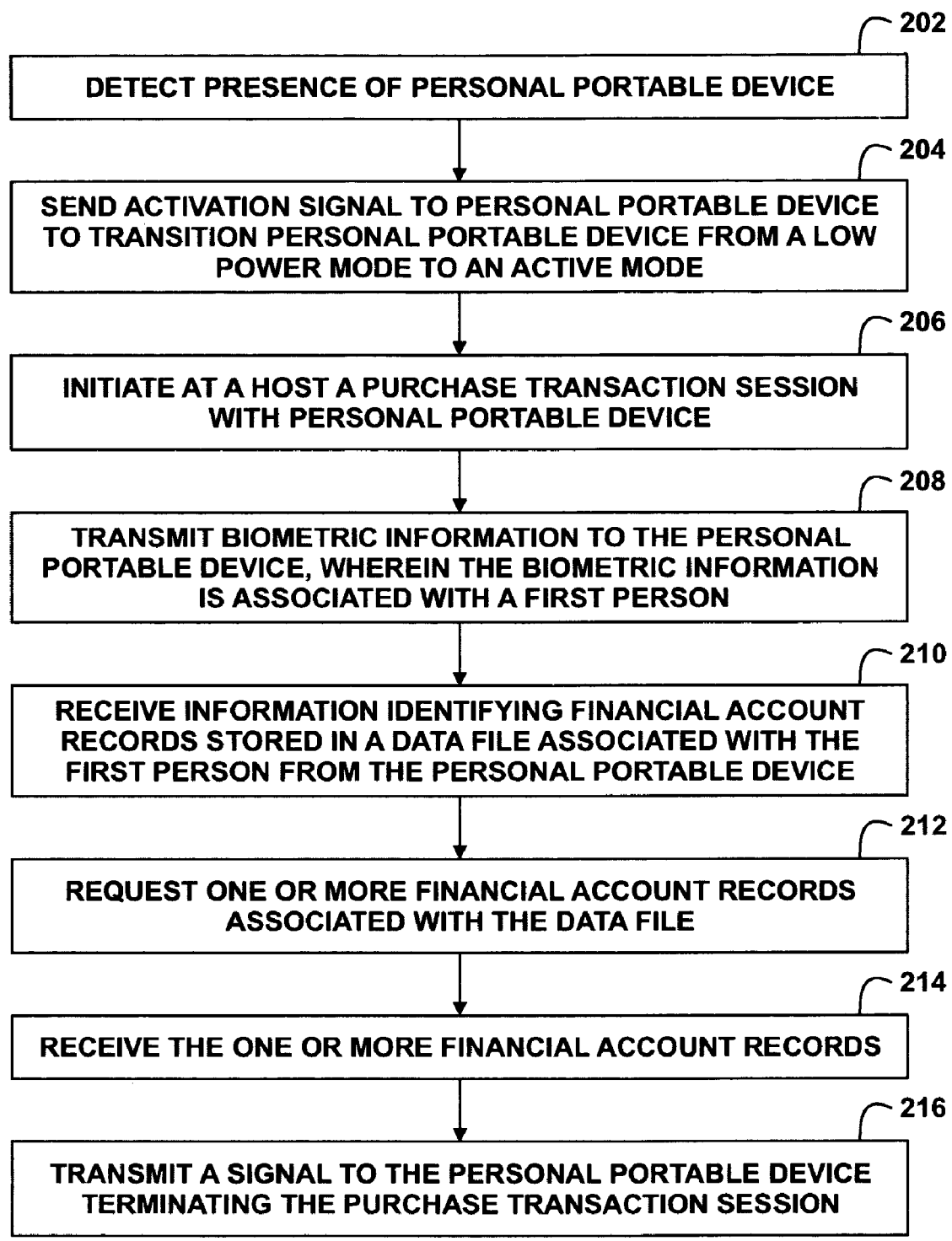
FIG. 2 is a flow chart of a method of conducting a financial transaction at a host computer in accordance with a particular embodiment.

Referring to FIG. 2, a flow chart of a method of communicating with a personal portable device is illustrated. At 202 the presence of a personal portable device is detected. The presence of the personal portable device may be detected by a host system. For example, the host device may include a magnetic detector that detects the presence of an inductor or other component incorporated in the personal portable device. Alternatively, the host system can periodically provide a wireless query to determine if there are any compatible personal portable device within range.

In accordance with one embodiment, the host can provide an activation signal at 202. In response to the receiving the activation signal, a personal portable device will transition from an inactive mode, such as low power mode, to an active mode. For example, the personal portable device may be a battery-powered device that operates in a low power mode. The low power mode may only provide enough power to allow detection of the activation signal. After receiving the activation signal, the personal portable device may transition to an active mode. In the active mode, the personal portable device may perform other functions, such as transmission of information to a host device. The personal portable device may return to the low power mode after a financial transaction has been completed. Use of the low power mode may allow longer battery life for the personal portable device. In another particular embodiment, the personal portable device may include an "off" mode, where the device does not perform any functions. The personal portable device may be transitioned from the off mode to the low power or active mode through activation of a switch or other input device on the personal portable device.

Proceeding to 206, a purchase transaction session with the personal portable device is initiated at a host device. The host device may be a personal computer, a cash register, or the like. In a particular embodiment, a wireless protocol supported by the personal portable device is detected after the purchase transaction session has been initiated. Moving to step 208, biometric information is transmitted to the personal portable device. In a particular embodiment, the biometric information may be transmitted according to a wireless protocol supported by the personal portable device. Password information may be used instead of, or in addition to, the biometric information.

The biometric information is associated with a person. The person will typically be a customer in possession of the personal portable device. The biometric information may be fingerprint or other biometric information provided by the customer to the host to allow the host to authenticate the identity of the possessor of the personal portable device.

At 210, information identifying financial account records stored in the data file associated with the person is received from the personal portable device. The information may be received after the biometric information has been authenticated.

At 212, one or more financial account records associated with the data file are requested from the personal portable device. The financial account records may include credit card information, bank account information, or other financial information. In a particular embodiment, each financial account is a credit card account, and the one financial account records include credit card numbers. In another particular embodiment the financial accounts may be debit card accounts, checking accounts, or other financial accounts.

At 214, one or more financial account records are received from the personal portable device. The host device may use the financial account records to obtain payment for the purchase transaction. Proceeding to step 216, a signal is transmitted to the personal portable device terminating the purchase transaction session.

Figure 3:
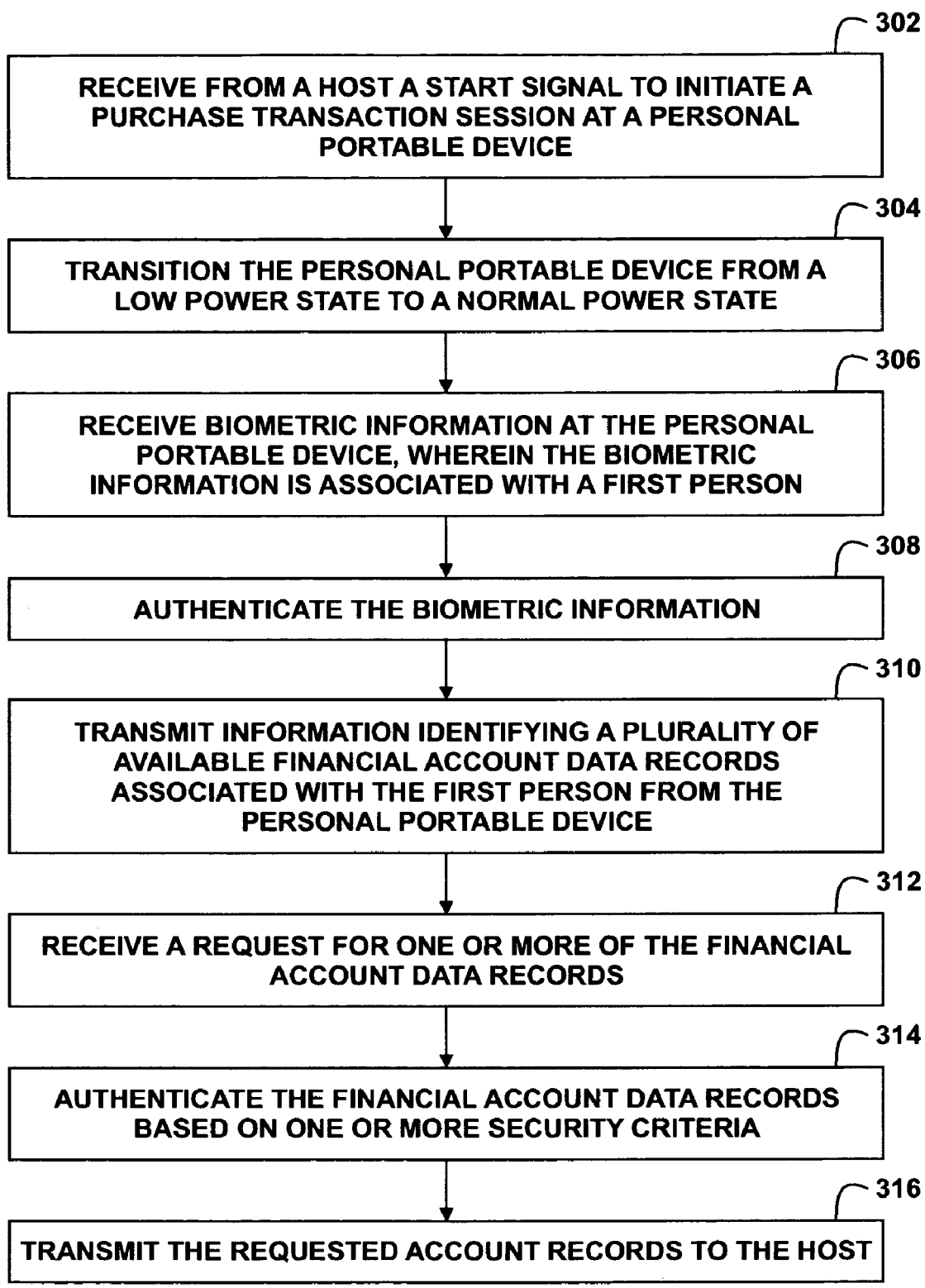
FIG. 3 is a flow chart of a method of conducting a financial transaction at a personal portable device in accordance with a particular embodiment.

Referring to FIG. 3, a method of conducting a financial transaction at a personal portable device is illustrated. At step 302 a start signal is received from a host to initiate a purchase transaction session at a personal portable device. Proceeding to step 304, the personal portable device is transitioned from a low power state to a normal power state. In a particular embodiment, the normal power state is an operational state for purposes of communication with the host to conduct a transaction. The low power state is operable to communicate with the host for purposes of wake-up, but not for conducting a full financial transaction. Moving to step 306, biometric information is received at the personal portable device. The biometric information is associated with a person, such as the owner or possessor of the personal portable device.

Moving to step 308, the biometric information received is authenticated. The biometric information may be authenticated by comparing the received information to biometric information stored at the personal portable device.

Proceeding to step 310, information identifying a plurality of available financial account data records associated with the person are transmitted from the personal portable device. The financial account data records may include credit card information, checking account or other bank information, or other financial account information. In a particular embodiment, the financial account data records are encrypted.

At step 312 a request is received at the personal portable device for one or more of the financial account data records. Moving to step 314, the financial account data records are authenticated at the host device based on one or more security criteria. The security criteria can include password information, further biometric information, or other security information. The security criteria may be set by a user. After the account data records have been authenticated, the method moves to step 316 and the requested account records are transmitted to the host. The host may use the transmitted account records to assess a charge associated with the particular financial account to complete the financial transaction.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, comprising:
   initiating at a host a purchase transaction session with a personal portable device;
   transmitting from the host biometric information to the personal portable device, wherein the biometric information is associated with a first person;
   receiving at the host information identifying a plurality of available data files associated with the first person from the personal portable device after transmitting the biometric information, wherein each available data file is associated with a corresponding financial account of the first person, each available data file comprising a plurality of account records;
   requesting from the host one or more account records associated with a first data file of the plurality of available data files from the portable device; and
   receiving at the host the one or more account records.

2. The method of claim 1, wherein the biometric information is transmitted to the personal portable device wirelessly.

3. The method of claim 2, further comprising:
   detecting a wireless protocol supported by the personal portable device, and wherein transmitting the biometric information includes transmitting the biometric information according to the wireless protocol.

4. The method of claim 1, further comprising:
   detecting the presence of the personal portable device.

5. The method of claim 4 wherein detecting the presence of the personal portable device comprises sending an activation signal to the personal portable device to transition the personal portable device from a low power mode to an active mode.

6. The method of claim 1, wherein each financial account is a credit card account, and the one or more account records includes a record having a first credit card number.

7. The method of claim 1, wherein the biometric information includes fingerprint information.

8. The method of claim 1, further comprising:
   receiving at the host a record update request to be transmitted to the personal portable device based on the one or more account records; and
   transmitting from the host the record update request to the personal portable device.

9. The method of claim 1, further comprising:
   transmitting from the host a signal to the personal portable device terminating the purchase transaction session.

10. A method comprising:
    receiving at a personal portable device a start signal to initiate a purchase transaction session;
    receiving at the personal portable device biometric information associated with a first person;
    transmitting from the personal portable device information identifying a plurality of available data files associated with the first person from the personal portable device after receiving the biometric information, wherein each available data file is associated with a corresponding financial account of the first person, each available data file comprising a plurality of account records;
    receiving at the personal portable device a request for one or more account records associated with a first data file of the plurality of available data files from the host; and
    transmitting from the personal portable device the one or more account records to the host.

11. The method of claim 10, wherein the one or more account records are encrypted.

12. The method of claim 10, further comprising:
    authenticating the biometric information.

13. The method of claim 10, further comprising:
    transitioning the personal portable device from a low power state to a normal power state in response to receiving the start signal.

14. The method of claim 10, further comprising:
    authenticating the one or more account records based on one or more security criteria.

15. The method of claim 14, wherein the one or more security criteria are set by a user.

16. The method of claim 10, wherein each financial account is a credit card account and the one or more account records includes a record having a first credit card number.

* * * * *